(12) United States Patent
Saraph (10) Patent No.: US 7,231,459 B2
(45) Date of Patent: Jun. 12, 2007

(54) ROUTING SCHEME BASED ON VIRTUAL SPACE REPRESENTATION

(76) Inventor: Girish P. Saraph, Indian Institute of Technology Bombay, Department of Electrical Engineering, Powai, Mumbai 400 076 (IN)

( * ) Notice: Subject to any disclaimer, the term of this patent is extended or adjusted under 35 U.S.C. 154(b) by 581 days.

(21) Appl. No.: 10/739,655

(22) Filed: Dec. 17, 2003

(65) Prior Publication Data

US 2004/0193729 A1    Sep. 30, 2004

Related U.S. Application Data

(60) Provisional application No. 60/434,300, filed on Dec. 17, 2002.

(51) Int. Cl.
*G06F 15/173* (2006.01)
(52) U.S. Cl. .................. 709/241; 709/220; 709/242
(58) Field of Classification Search ................ 709/241, 709/224, 242, 220
See application file for complete search history.

(56) References Cited

U.S. PATENT DOCUMENTS

| | | | |
|---|---|---|---|
| 6,256,295 B1 * | 7/2001 | Callon | 370/254 |
| 6,260,072 B1 * | 7/2001 | Rodriguez-Moral | 709/241 |
| 6,646,989 B1 | 11/2003 | Khotimsky et al. | |
| 6,701,459 B2 * | 3/2004 | Ramanathan et al. | 714/37 |
| 6,728,214 B1 * | 4/2004 | Hao et al. | 370/241 |
| 6,735,548 B1 * | 5/2004 | Huang et al. | 702/179 |
| 6,906,709 B1 * | 6/2005 | Larkin et al. | 345/419 |
| 2002/0101869 A1 | 8/2002 | Garcia-Luna-Aceves et al. | |
| 2003/0028630 A1 * | 2/2003 | Bischof et al. | 709/223 |
| 2003/0107992 A1 | 6/2003 | Garcia-Luna-Aceves et al. | |
| 2004/0042406 A1 * | 3/2004 | Wu et al. | 370/238 |

* cited by examiner

*Primary Examiner*—Zarni Maung
*Assistant Examiner*—Nghi Tran
(74) *Attorney, Agent, or Firm*—Perkins Coie LLP (57) ABSTRACT

A method and apparatus for a routing scheme based on virtual space representation is described and illustrated. In one embodiment, the invention is a method of operating a network. The method includes translating a topology of the network into a digital representation in the form of multi-dimensional spatial configuration wherein a directed distance to any destination node or site indicates the available path options with the least or low number of hops through the network. The method also includes adding transmission cost data to the digital representation. The method further includes operating the network based on the digital representation.

47 Claims, 5 Drawing Sheets

ROUTING SCHEME BASED ON VIRTUAL SPACE REPRESENTATION

CLAIM OF PRIORITY AND CROSS REFERENCE

This application claims priority to provisional application serial No. 60/434,300, filed on Dec. 17, 2002, which is hereby incorporated herein by reference.

FIELD

The present invention relates, in general, to routing in multi-commodity flow systems, and in particular, to routing data packets in communication networks.

BACKGROUND

Information exchange over communication networks is an essential part of the on-going revolution in information technology. In packet switched communication networks, routing of data-blocks or packets at each node is performed based on the information contained in the header of each packet. The networks can be classified into two categories viz., (i) connection-based such as, Asynchronous Transfer Mode (ATM) networks, and (ii) connectionless such as, Internet Protocol (IP) networks.

The IP protocol provides the most flexible, scalable, and robust platform and is currently the most widespread. It is being supported by a variety of applications, including data applications such as, Email, FTP, Web or Internet, as well as digitized voice and video applications. However these applications are typically served on a best-effort basis with no real-time performance guarantees. Since the IP packets are routed individually in a connectionless manner, packets from a given data flow may follow different paths through the network leading to variable performance. Since no network resources are reserved for a given communication channel, the channel performance may vary in terms of throughput, packet delay, delay jitter, and losses. Thus, IP protocol cannot guarantee a quality of service (QoS) in terms of fixed bandwidth, maximum delay, or maximum packet drop-rates.

The tasks performed by IP routers are commonly categorized into two types, routing and forwarding. The execution of routing protocols; creation, maintenance, and updates of routing-tables; exchange of routing information; and signaling are known as the routing tasks. They provide intelligence and decision making capability to configure or modify the data plane, in which the packet forwarding takes place. Thus, the routing tasks are said to constitute the control plane. Whereas, the forwarding tasks constitute the data plane and include receiving the incoming packet, error checking, header extraction, modification, determination of forwarding path, data buffering, scheduling, providing internal switched path, and then, forwarding the packet to the next hop destination. The forwarding tasks are performed on every packet. An IP router is said to perform at wire-speed if it can complete the forwarding tasks on the incoming packets before the arrival of the next ones for minimum size packets at the maximum line speeds (such as OC-48, i.e. 2.5 Gbps for example).

An IP router forwards an IP packet to its destination (or to an intermediate next-hop node in its path) by evaluating its header information. A router first determines a key (or destination IP-address string) from the header of each packet and then performs a look-up in a routing table for the best match with the key. The key may match multiple entries in the look-up table and one entry is chosen based on the best (or the longest prefix) match criterion. The matched entry indicates the output port leading to the next-hop node for the packet towards its final destination. The routing table entries are updated regularly by the routing protocols to reflect the dynamic network conditions. As the routing entries get modified, the forwarding actions on the incoming packets change accordingly.

Packets from a continuing data-stream can be forwarded using a fast, hardware based solution in the router design. In a data flow, once the path for the first packet (or the first few) is established using the routing look-up table then, a requisite entry can be introduced in the fast, hardware based hash-tables. A hashing table consists of a set of compressed, fixed length data entries for keys and the corresponding output ports in a content-addressable memory (CAM) for a quick and reliable parallel search. The ternary CAM (TCAM) chips enable very quick searches of about 10 ns per cycle. However, CAM's are limited in size to a few Mb and cannot store large tables. They are also a lot more expensive than the standard static RAM (SRAM) chips. SRAM chips are also limited in size. Fast dynamic RAM variants, RDRAM and DDRAM chips are also available, which have bigger capacities. In addition to the memory considerations, the common hashing algorithms cannot guarantee the worst-case performance and once the algorithm has to go to second or third choices for large data tables the performance degrades. Any modifications in large hashing tables such as updates, insertions, or removals of entries, are rather complex and slow.

The large look-up tables are typically stored in fast SRAM memory modules in the form of a binary or multi-bit data tries. The trie can be constructed based on the prefix value or the prefix length. The address key of a packet determines the path through the multi-level trie to the final leaf-node. The leaf-node has a pointer to the output port leading to the next-hop destination for the packet. The trie structure is typically optimized to complete the address look-up in two to three memory accesses. Further speed-up can be achieved by implementing the multi-level memory accesses in parallel so as to support one address look-up per memory access cycle.

In a large network the number of entries in a look-up table of a core router can be very large. Traditional A, B, and C type network classes result in IP addresses with fixed prefix lengths of 8, 16, and 24-bits. The introduction of classless network addresses (classless inter-domain routing or CIDR) has led to a greater flexibility in address space allocation by permitting different prefix lengths. However, data sorting schemes that are based on exact matches of fixed length prefixes (8, 16, and 24-bits) are not effective with CIDR. In order to minimize the number of routing table entries, the forwarding paths (or routes) are aggregated using shorter length prefixes, permitting some overlap in address spaces. However, this overlap leads to multiple matches and then the longest prefix match (LPM) has to be selected. The data sorting and look-up scheme has to support the LPM. The migration from IP version-4 addressing system to IP version-6 further complicates the issue, since the IPv6 addresses are 128 bits long instead of 32. The data entries in the look-up table would be correspondingly longer and varied in prefix lengths and diverse in route aggregations.

Currently, a core IP router may have look-up entries in excess of 140,000, which makes the route processing rather slow and costly. Since the look-up tables are very big, an IP router requires a processor with access to a fast (and costly)

external memory. Some performance enhancement may be obtained by using different implementation schemes for caching, entry time-out, parallelism, and data structure management. However, the large size of the router look-up table remains a performance bottleneck for high-speed operation and the main reason for high hardware and software costs. It would be useful to make the forwarding decisions very fast and at low cost, thereby reducing or eliminating costs associated with the fast memory storage, access, and data structure management. It is also desirable to simplify the routing tasks of route processing, table updates, and information exchange.

In order to support the real-time voice and video applications connection-based ATM networks are commonly used. In ATM networks end-to-end connections are established as virtual circuits (VCs). The routing decisions for call set-up and tear-down for each data-flow take place in the control-plane, which is kept separate from the data-plane. Each flow consists of fixed-size packets or cells and is identified by its labels or virtual path and circuit identifiers (VPI/VCI). The cell switching takes place in the data-plane by label swapping and forwarding. Once the virtual circuit between a source and destination is established, the data-plane component of ATM switching is fast and at relatively low cost. Thus ATM networks can provide QoS guarantees for real-time applications. However, they do not provide the flexibility and scalability of IP networks and are not suitable for supporting a large number of bursty and short-lived data-flows. In order to support many applications from the IP platform, protocols for mapping IP over ATM are developed.

Multi Protocol Label Switching (MPLS) developed to combine the fast and cheap label swapping technique (from ATM) in the data plane and use IP routing protocols in the control plane. Stand-alone MPLS routers are available, which support a mixed (IP and MPLS) traffic. An existing ATM switch can be modified by adding an adjunct processor running IP routing protocols to make it into a fast and relatively cheap MPLS router with limited capabilities. Conventional IP routing protocols or explicit routing can be used to determine the label-switching paths and to create the forwarding table entries for label swapping. A typical forwarding table may have label bindings of a few hundred to a few thousand. However, a certain fraction of the data-traffic, which does not have an already established label-switched path, follows the conventional IP forwarding. Thus, fast IP forwarding remains an important factor in determining the net performance of an MPLS router and can otherwise act as a bottleneck.

The IP routing tables can be computed using different routing schemes. The common routing protocols can be categorized into two groups, as follows:

(i) Distance-Vector or Path-Vector algorithms: Each router maintains a distance-vector to reach every other known destination node in the network in terms of the minimum number of hops or total cost. Each router forms a consistent picture of the entire network topology and load conditions by exchanging distance-vector (or path-vector) information with its neighbors and modifying its entries accordingly. The information is updated on a regular basis to take into account the dynamic network conditions. Common protocols based on the distance-vector algorithms include Routing Information Protocol (RIP), Border Gateway Protocol (BGP), Exterior Gateway Protocol (EGP), etc.

(ii) Link-State algorithms: Each router broadcasts information about the links directly connected to it to all other routers in the network. Hence, each router has information about the entire network topology and the link costs. The router then computes shortest path (in terms of the minimum number of hops or the least cost) to each destination node by using the Dijkstra algorithm or some other algorithm. Common protocols based on the link-state algorithms include Open Shortest Path First (OSPF) protocol in the Internet and Private Network-Network Interface (PNNI) protocol in ATM networks.

Both the types of algorithms rely on information about the network conditions to flow from distant network nodes to a given router either directly (link-state type) or indirectly (distance-vector type). This requires excessive information storage and exchange leading to excess costs and overhead hits in terms of the available bandwidth, processing speed, hardware costs, memory, and memory I/O. The proposed algorithm would eliminate the necessity for such information exchanges, updates, storage, and all the associated costs. At the same time the network routing would adapt to the dynamic load conditions without any delay. The network can easily mitigate the dynamic situations of link breakages, node outages, or traffic congestions. It would navigate the new and existing communication data streams by bypassing the problem areas.

Typically current networks use routing algorithms that are deterministic and single-path. This can lead to uneven loading in network links and load oscillations under dynamic conditions. Although, multiple-path routing has been studied before, in conventional routing it requires additional information exchange, path computing, routing table space, and complexity. It may be useful to incorporate multi-path and stochastic routing without these additional resources in terms of time, cost, storage, or complexity. This may lead to a fairly even load-balancing in the network and hence, better network utilization and higher throughputs.

SUMMARY

The present invention is described and illustrated in conjunction with systems, apparatuses and methods of varying scope. In addition to the aspects of the present invention described in this summary, further aspects of the invention will become apparent by reference to the drawings and by reading the detailed description that follows.

A method and apparatus for a routing scheme based on virtual space representation is described and illustrated. In an embodiment, the invention is a medium embodying instructions. The instructions, when executed by a processor, cause the processor to execute a method of operating a network. The method includes translating a topology of the network into a digital representation in the form of multi-dimensional spatial configuration. The method also includes operating the network based on the digital representation. The method may further includes adding transmission cost data to the digital representation.

In another embodiment, the invention is an apparatus. The apparatus includes a network topology translator for a digital representation in the form of multi-dimensional spatial configuration. Moreover, the apparatus includes a link and node cost update module and a network digital representation storage module coupled to the network topology translator and the link and node cost update module. Furthermore, the apparatus includes a network controller coupled to the network digital representation storage module.

In another alternate embodiment, the invention is an apparatus for operating a network. The apparatus includes means for translating a topology of the network into a digital representation in the form of multi-dimensional spatial configuration. The apparatus also includes means for adding transmission cost data to the digital representation. The apparatus further includes means for operating the network based on the digital representation.

In still another alternate embodiment, the invention is a method of operating a network. The method includes translating a topology of the network into a digital representation in the form of multi-dimensional spatial configuration whereby a directed distance to any destination node or site indicates the available path options with the least or low number of hops through the network. The method further includes operating the network based on the digital representation. The method may also include simulating the network using the digital representation to add transmission cost data to the digital representation.

In yet another alternate embodiment, the invention is a method of operating a network. The method includes translating a topology of the network into a digital representation. The method also includes simulating the network using the digital representation to adjust the digital representation. The method further includes operating the network based on the digital representation.

In still another alternate embodiment, the invention is a medium embodying instructions. The instructions, when executed by a processor, causing the processor to execute a method of operating a network. The method includes translating a topology of the network into a digital representation. The method further includes simulating the network using the digital representation to adjust the digital representation. The method also operating the network based on the digital representation.

In yet another alternate embodiment, the invention is a method of operating a network. The method includes representing in a digital representation of spatial configuration a network topology of individual nodes and connections of the network. The method further includes simulating forces on the individual nodes in a multi-dimensional space to transform the digital representation. In the digital representation, a directed distance to any destination node or site indicates the available path options with a low (or least) number of hops through the network. The method also includes operating the network using the digital representation.

The present invention is exemplified in the various embodiments described, and is limited in spirit and scope only by the appended claims.

BRIEF DESCRIPTION OF THE DRAWINGS

The present invention is illustrated in various exemplary embodiments and is limited in spirit and scope only by the appended claims.

DETAILED DESCRIPTION

The present invention is described and illustrated in conjunction with systems, apparatuses and methods of varying scope. In addition to the aspects of the present invention described in this section, further aspects of the invention will become apparent by reference to the drawings.

The present invention relates, in general, to routing in multi-commodity flow systems, and in one embodiment, to routing data packets in communication networks. In some embodiments, the inventions is a method of routing data packets. First, the topology information in a given network is expressed in terms of a multi-dimensional virtual space (VS) configuration. The topology information is embedded in such a manner that the directed distance in the VS geometry indicates the available path options with least or low number of hops. Then, the virtual space geometry and link cost information is used to direct packets or commodities through the network. The link cost function reflects the dynamic traffic conditions and any direct cost factors. The VS based routing can be used as a stand-alone IP routing protocol or used with the conventional IP, ATM, MPLS, or GMPLS schemes for path selection, QoS support, protection, and traffic engineering.

Currently, a core IP router may have look-up entries in excess of 140,000, which makes the route processing rather slow and costly. Since the look-up tables are very big, an IP router requires a processor with access to a fast (and costly) external memory. Some performance enhancement may be obtained by using different implementation schemes for caching, entry time-out, parallelism, and data structure management. However, the large size of the router look-up table remains a performance bottleneck for high-speed operation and the main reason for high hardware and software costs. The proposed invention, in some embodiments, essentially eliminates the routing table, making the forwarding decisions very fast and at low cost. The costs associated with the fast memory storage, access, and data structure management are essentially eliminated. This also may greatly simplify the routing tasks of route processing, table updates, and information exchange.

Typically current networks use routing algorithms that are deterministic and single-path. This can lead to uneven loading in network links and load oscillations under dynamic conditions. Although, multiple-path routing has been studied before, in conventional routing it requires additional information exchange, path computing, routing table space, and complexity. The present invention, in some embodiments, can incorporate multi-path and stochastic routing without any additional resources in terms of time, cost, storage, or complexity. This can lead to a fairly even load-balancing in the network and hence, better network utilization and higher throughputs.

In some embodiments, the present invention achieves high throughput for single-path as well as multi-path routing. In both forms it achieves good load balancing in the network reducing the chances and severity of network congestion. It uses multi-faceted link cost function to achieve traffic engineering under dynamic load conditions. In some embodiments, it can support differential services by using multiple priority levels for different data flows or applications. In another embodiment, the proposed routing scheme can also be used for establishing a virtual circuit-switched or a label-swapping path such as in ATM or MPLS. This can support real-time applications with QoS requirements. In addition, resource reservation protocols can also be used to provide explicit performance guarantees. In case of a link or a node failure within the path of an existing connection, it can quickly establish a back-up path for rerouting.

In some embodiments, the present invention can be implemented in software and executed on the network processor or main CPU or on the forwarding engines at individual input ports. In other embodiments, it can be implemented in hardware using an FPGA or a dedicated low complexity ASIC. The implementations in both, software as well as hardware, can be simple, fast, and cheap. The algorithm utilized has natural parallelism that can be exploited for further speed-up.

The present invention relates, in general, to routing in multi-commodity flow systems, and in particular, to routing data packets in communication networks. The invention, in some embodiments, converts the network topology information into the information embedded in the spatial configuration of the network in the multi-dimensional virtual space. The virtual space (VS) embedding is such that a directed VS distance to any destination node indicates the available path options with least (or low) number of hops through the network. A data packet or commodity whose destination address is converted into the VS coordinates can be routed through the intermediate nodes directly without any additional information.

A small angle between the directed VS distance to a given destination and a given link indicates a path with low hop-count, which is expressed in terms of low angle cost. In addition a link cost function is used to take into account dynamic load conditions and any direct cost factors. Additional node cost term can be introduced to provide better routing capability and take into account any fixed cost factors. A single decision variable, such as total cost, is defined for making routing decisions which combines the link cost, node cost, and angle cost.

A transformation of a planar network with a given topology into the VS representation is achieved by letting the network evolve under the influence of a set of forces, consisting of attractive, repulsive, and deterministic pseudo-random forces. The network nodes move separately due to these forces and the evolution continues for a set number of iterations. The identities of the individual network nodes and their connections are preserved through the transformation. The final VS representation reflects the network topology such that the directly connected nodes are approximately one unit distance away; the two-hop connection nodes are about two units away; the three-hop ones are about three units away; and so on. In addition, the directed distance between any two nodes in the network tends to indicate the available path options with the least (or low) number of hops.

The VS based routing potentially eliminates the need for a route look-up table along with the associated resources required for data storage, memory access, updates, route processing, and information exchange. The VS based routing can be used as a stand-alone routing protocol or used with the conventional IP, ATM, and MPLS for path selection, QoS support, protection, and traffic engineering. It can quickly adapt to the dynamic load conditions of traffic congestion or link breakage to enable QoS support or priority-based differential services. It can provide fast and scalable performance under dynamic and bursty load conditions. The fast load balancing may also improve the buffer utilization levels. The VS scheme can be implemented in software or hardware to give a simple, fast, and cheap solution for high-speed networks.

In one embodiment, the invention is a method for converting or representing network topology information into the information embedded in multi-dimensional virtual space configuration of the network. The virtual space (VS) embedding is such that a directed VS distance to any destination node indicates the available path options with least (or low) number of hops through the network. A data packet or commodity whose destination address is converted into the VS coordinates can be routed through the intermediate nodes directly without any additional information. This method requires minimal exchange and storage of the routing information making it fast, simple, and cheap to implement.

In another embodiment, the invention is a method of assigning cost, the so called angle-cost, based on the number of hops to final destination in the available path option and combining this cost with a link cost function to take into account dynamic load conditions and any direct cost factors, to form a single routing decision making variable, the so called total cost.

These methods may be used to route packets in communication networks. These methods may be used to set-up label-switched paths or virtual circuits to forward data packets or cells and achieve load balancing and congestion avoidance. These methods may be used for path selection, protection, QoS support, and traffic engineering in IP, ATM, or MPLS networks. These methods may be used for protection, recovery, and traffic engineering in GMPLS networks. These methods may be used to route multi-commodity flow systems.

In some embodiments, the invention includes a methodology to convert the network topology information into a multi-dimensional virtual space (VS) representation such that, the relevant information for routing packets or commodities is locally available to each node. The virtual space (VS) embedding is such that a directed VS distance to any destination node indicates the available path options with least (or low) number of hops through the network.

Also, in some embodiments, this invention includes a scheme for routing data packets or commodities through the flow network using the VS representation and the link cost function, which depends on the dynamic traffic conditions and any direct cost factors. The VS based routing of data packets can be used as a stand-alone IP routing protocol or used with the conventional IP, ATM, or MPLS protocols for path selection, QoS support, and traffic engineering.

Transformation of a planar network with a given topology into the multi-dimensional VS representation may be achieved by letting the network evolve under the influence of a set of forces defined below. The dimensionality ($N_d$) of the VS configuration is chosen based on the average connectivity or adjacency of each node and the size of the network. The results presented here are based on the dimensionality of 6, but may be expected to depend on network configuration. The forces are defined in one embodiment as follows (other embodiments or networks may use different force definitions):

Force on the directly connected nodes—This force, called $F_{1ij}$, acts like a spring force between the nodes $n_i$ and $n_j$ that are directly connected. It depends on the distance, $d_{ij}$ between the two nodes. When $d_{ij}$ is less than one unit, i.e. $d_{ij}=|d_{ij}|<1$, then $F_{1ij}$ is a repelling force (directed along the distance vector $d_{ij}$ between the two nodes) and acts on both the nodes to push them apart. Whereas, when $d_{ij}=|d_{ij}|>1$, then $F_{1ij}$ is an attracting force. This force tends to make the distance between the directly connected nodes close to unity. The functional form of the force amplitude can be suitably chosen (e.g. linear, logarithmic, or anything else) and the constants involved in the above definition can be optimized for best results for a wide variety of network topologies. The simulation results presented here use the following relationship:

$$F_{1ij}=|F_{1ij}|=k_1 \cdot \log(d_{ij}) \ldots k_1=12$$

The sign of the force amplitude in the above relation changes automatically at $d_{ij}=1$ to give the transition from the repelling to the attractive force. All such forces acting on the node $n_i$ due to all its directly connected neighbors add vectorially, to give the net force $F_{1i}$ given by, $$F_{1i}=\Sigma_j F_{1ij} \ldots \text{where } n_i \text{ and } n_j \text{ are direct neighbors}$$

Repulsive force on the nodes not connected directly—This force, called $F_{2ik}$, acts on the nodes $n_i$ and $n_k$ that are not directly connected to push them apart (along the distance vector $d_{ik}$). The amplitude of this force can be made dependent on the least number of hops, $N_{ik}$, between the two nodes. This force ensures that any two nodes that have a large number of (minimum) hops in between them are pushed apart in the VS configuration of the network. Again, different types of functionality in $F_2$ can be used for the repulsive force. The simulation results presented here use the following relationship:

$$F_{2ik}=|F_{2ik}|=k_2 \cdot (N_{ik})^\alpha/d_{ik} \ldots k_2=0.025 \text{ and } \alpha=2$$

In order to limit the computation involved, the force $F_2$ is considered a short-range force and applied only over a limited distance of less than 4 units i.e. $d_{ik}<4$. Thus, $F_2(d_{ik})=0$ for $d_{ik}>4$. The maximum value of $N_{ik}$ can be limited to a specific value, say 10, when the least number of hops is larger than that. The different repulsive forces acting on the node $n_i$ due to all the applicable nodes $n_k$ are added vectorially, to give the net force $F_{2i}$ given by, $$F_{2i}=\Sigma_k F_{2ik} \ldots \text{where } n_i \text{ and } n_k \text{ are not direct neighbors and } d_{ik}<4$$

Random kick force—This is a deterministic, pseudo-random force $F_3$ used to kick individual nodes in the multi-dimensional VS configuration. It can facilitate evolution of the VS configuration solution to reach the global energy minima instead of the local ones. It may also seed the initial evolution in the multi-dimensional space. The random kick $F_{3i}$ given to the node $n_i$ has an arbitrary amplitude (within a fixed range) and an arbitrary direction, given by a random number sequence. A deterministic, pseudo-random number ($R_n$) generator program (with the $R_n$ sequence in the range of [0,1]) may be used, instead of a fully random sequence, due to ease and repeatability of the simulations. For the multi-dimensional virtual space with dimensionality $N_d$, all the components of $F_{3i}$ are given by the $N_d$ consecutive pseudo-random numbers. The simulation results presented here use the following relationship:

$$F_{3iq}=|F_{3i} \cdot q|=k_3 \cdot R_{nq} \ldots q=1, 2, \ldots, N_d$$

Where $F_{3iq}$ is the q-th component of the force $F_{3i}$ in the multi-dimensional space with dimensionality $N_d$. The value of $k_3$ is kept high in the initial stages of the evolution (say, $k_3=0.5$) and as the process progresses the random kick force is reduced by lowering the value of $k_3$.

The total force $F_{ti}$ acting on the node $n_i$ is a vector sum of the three forces listed above and is given by, $F_{ti}=F_{1i}+F_{2i}+F_{3i}$. The node $n_i$ moves under the action of this force.

The initial conditions of a given network in one embodiment may be specified as a 2-dimensional topology plot of the network expressed as 2-D coordinates of nodes and their network connections. A given network may also be specified only as a connectivity matrix for the individual numbered nodes using 1's and 0's, which correspond to the directly connected node-pairs and the remaining node-pairs, respectively. The unspecified 2-D coordinates can then be initialized using the pseudo-random number sequence. All other VS-based multi-dimensional (beyond 2-D) coordinates can be either initialized to zero or chosen randomly. The multi-dimensional random kick and other forces ensure that the network configuration evolves in the full $N_d$-dimensions. The network evolves into the final VS configuration that enables efficient VS-based routing in spite of the randomly chosen initial conditions. However, it is expedient to keep these random coordinates range-bound (say, [−10,10]). Note that the final multi-dimensional VS volume of the entire network configuration is of the order of the total number of nodes in the network.

To verify the usefulness of the method and apparatus, a sample network can be constructed using a randomly chosen connectivity matrix in addition to random initial coordinates. In this case the network is specified in terms of only the total number of nodes and the average connectivity per node. Simulations for randomly constructed networks with 25 and 100 nodes and average connectivity of 4 and 6 each were conducted. Instead of randomly selected node connections, the network topologies can also be constructed by drawing connectivity on paper. Such topologies can have higher percentage of short-range connections (to local or neighboring nodes), which resembles the real networks better. The results for the VS-based routing are presented in latter sections.

Once the initial conditions of the network are specified, it is allowed to evolve in the multi-dimensional virtual space under the influence of the forces specified above. For every iteration, each node, $n_i$, moves by a distance, $\Delta_i$, under the resultant or total force, $F_{ti}$, acting on it such that, $$\Delta_i=k_4 \cdot F_{ti} \ldots k_4=0.1$$

The nodes move without acquiring any kinetic energy or momentum in the process. The VS configuration is allowed to evolve for a fixed number of iterations (such as 40 for example). The final VS configuration tends to have internodal VS-distance, $d_{ik}$, between the two nodes $n_i$ and $n_k$ that roughly matches with the least number of hops, $N_{ik}$. To measure deviation from it, a parameter, $\delta_{ik}$, is defined as, $$\delta_{ik}=|(d_{ik}-N_{ik})|/N_{ik}$$

Figure 1A:
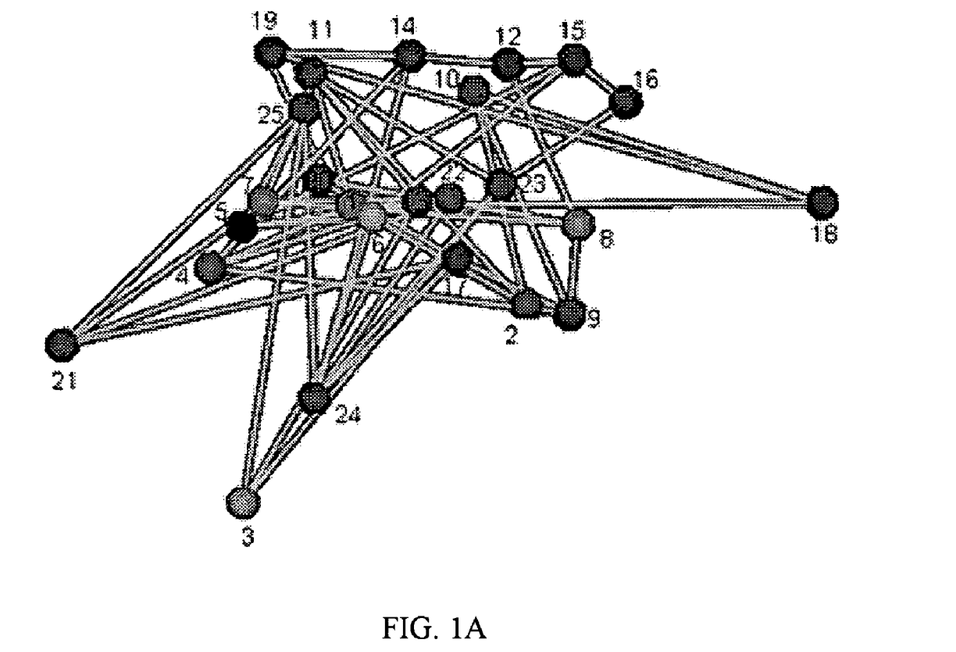
FIG. 1(a) illustrates an exemplary 25 node network with average connectivity of 4 and randomly selected network connections built as a planar topology with random coordinates.
Figure 1B:
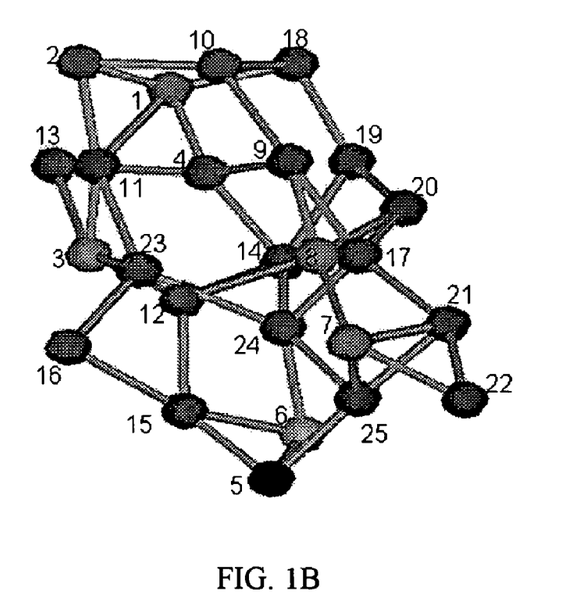
FIG. 1(b) illustrates the same 25 node network as in FIG. 1(a) shown after evolution in the three-dimensional virtual space, or a 3-D VS configuration.

An average value of all the $\delta_{ik}$ values in the configuration is called average deviation, $\delta_{avg}$. It is calculated after each iteration and tracked to ensure that it decreases initially and then saturates to a low value (about 0.2 or less) near the end of the evolution (30 or 40 iterations). The final multi-dimensional VS configuration of the network has all the network topology information embedded in it. The virtual space (VS) embedding is such that a directed VS distance to any destination node indicates the available path options with least (or low) number of hops through the network. An example of a transformation from a planar 25-node network topology into a 3-D VS configuration is shown in FIG. 1. The figure shows that the nodes get rearranged to reflect the original network topology information in terms of the VS embedding.

The computation involved in the above-mentioned transformation or embedding of the network topology information into the VS configuration can be handled by a specific central node in the network. After the task is completed the node can send relevant VS coordinate information to individual nodes in the network. The central node can also perform the role of an ARP-server (ARP≡Address Resolution Protocol) to resolve the IP or ATM address in terms of the VS coordinates and vice versa. To avoid a single point of failure the role of the central node can be duplicated by using plurality of central nodes and the ARP task can also be subdivided into different network domains. Since the algorithm for generating the VS configuration, mentioned above, is fully deterministic, the information from the multiple computations remains consistent.

It is envisaged that the VS configuration can remain unchanged for a long duration (for weeks or months) till the network topology changes significantly, e.g. with the addition new nodes and links. Any dynamic network conditions or temporary failures of links or nodes are reflected in the link and node costs, as would be discussed in later sections. These dynamic conditions do not require recomputation of VS configuration. An extra (say) a 3-bit tag can be added in the header to indicate the version of the VS address to maintain consistency between multiple central nodes, mentioned above. Also, the multiple central nodes need to maintain consistent information regarding the network topology and any long-term changes in terms of new nodes or links, etc. The topology information can be expressed in terms of the least number of hops ($N_{ik}$) matrix having dimensions $N_M \times N_M$, where $N_M$ is the total number of nodes in the VS based network domain. The row and column indices of each element indicate the starting and ending nodes, $n_i$ and $n_k$, respectively. The $N_{ik}$ matrix is symmetric with the diagonal elements being zero. The direct connections between the nodes correspond to $N_{ik}=1$ and are subsequently used to identify the two-hop ($N_{ik}=2$) connections, then $N_{ik}=3$ and so on. Thus, if the maximum value of $N_{ik}$ is limited to 10, as mentioned above, then the least number of hops matrix is created in 10−1=9 steps.

In one embodiment, a network domain is established, which uses VS based routing for routing data packets. At the edge of the domain the address conversion from the destination IP address of each packet to the destination VS address has to take place. The edge nodes can add an extra header (or modify the existing one) to an incoming IP packet using the destination VS address. It is estimated that about 8–10 byte VS header can be sufficient depending upon the size of the network being addressed. The header should include the destination VS address (such as for 6-dimensional coordinates, 6 bytes for example), its version tag (such as 3 bits for example), priority level (such as 3 bits for example), time-to-live or TTL field (such as 6 bits for example), and any extra functionality.

In another embodiment, the VS based routing scheme is only used for establishing a virtual circuit switching or label swapping paths in terms of ATM virtual path and circuit identifiers (VPI/VCI) or MPLS labels, respectively. The path establishment request can be routed using the VS configuration overlay and required resources can be reserved for providing quality of service (QoS) guarantees. In case of a multi-protocol environment the header should identify a type of the request packet being sent. All additional functionalities for QoS support or resource reservation may also be specified by choosing extra identifying bits in the VS-header. An additional advantage of VS based routing is in terms of establishing an alternate path if one of the links or nodes from the original path fails. The VS based routing can quickly establish alternate or back-up path in order to support critical real-time applications.

The VS based routing at an intermediate node, $n_i$, in the VS domain (mentioned above) is based on the VS address of the final destination node, $n_D$, of the packet. A cost function, $C_{ij}$, is evaluated for each outgoing link from $n_i$ to its neighbor $n_j$ given by $$C_{ij}=C_1 \cdot (1-\cos \theta_j)+C_{2ij}+C_{3j}$$

Where $C_1$ is a constant and is fixed at 0.5 for the simulation results presented here. The angle $\theta_j$ is an angle between the directed distance to the final VS destination $d_{iD}$ (from $n_i$ to $n_D$) and the outgoing link direction given by the distance vector $d_{ij}$ (from $n_i$ to $n_j$) in the multi-dimensional virtual space. It can be seen that when the final destination node is perfectly aligned to one of the outgoing links in the virtual space the first term in the cost function, called as angle cost, will become zero. It is possible to use some other function (other than cosine) to define the angle cost in terms of $\theta_j$.

The second term in the cost function is a link cost function, $C_{2ij}$, for the link between $n_i$ to $n_j$ nodes. It reflects the dynamic traffic conditions and any direct cost factors involved. As the link and buffer capacity utilization increases this term increases in value making the link a less attractive choice. For the simulation results presented here $C_{2ij}$ is chosen randomly between 0.2 and 0.8. A failure of a link is indicated by making the link cost term to go to 2.0 or more, which is specified as a broken link level. Hence, the link is automatically removed from consideration. The third term $C_{3j}$ is a node cost term for node $n_j$ and is an average of all the outgoing links from that node. This gives the forward visibility for avoiding any network congestion downstream. Any direct costs associated with the node can also be included if required.

In single path routing, each packet is routed along the link having the lowest total cost (single choice). The advantage of single path routing is that a given data stream would follow the same path and the sequence of packets would remain unchanged, as long as the link costs are unchanged. Whereas, in multi-path routing one or more low cost paths (multiple choices) are possible at each intermediate node. The path selection is based on a probability function that depends on the total cost of each link. In the multi-path simulation results presented here, all the links having total costs within a fixed cost differential of +0.5 from the lowest available value are chosen with equal probability. In another embodiment, the probability of selection can be made inversely dependent on the total cost function or some other probability function can be used. Various embodiments can incorporate multi-path and stochastic routing without any additional resources in terms of time, cost, storage, or complexity. They provide a quick recovery from any link or node failures.

Figure 2:
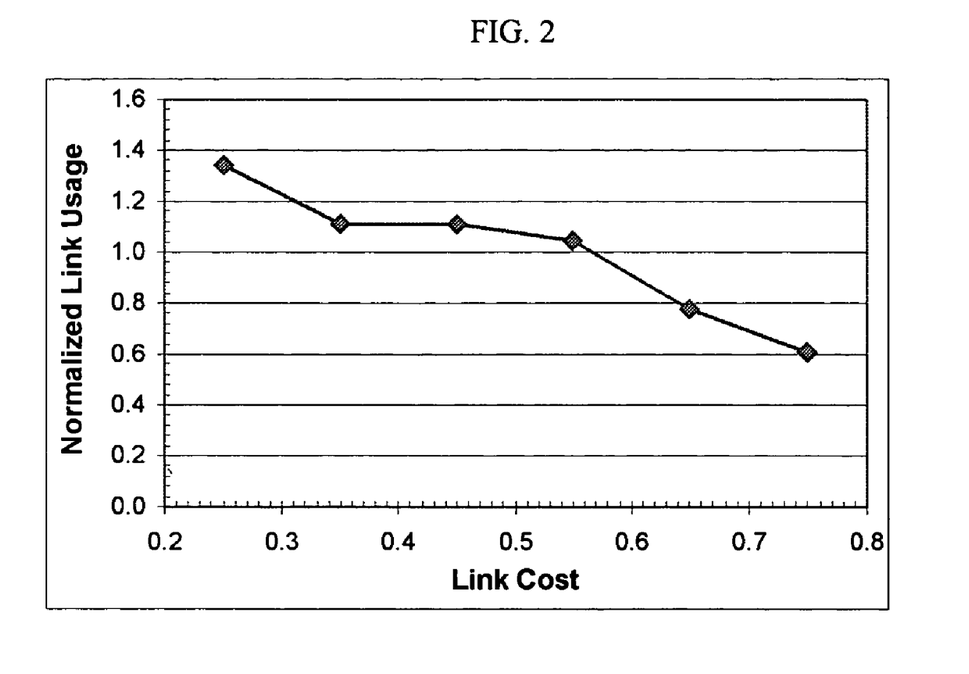
FIG. 2 is a plot of the normalized link usage versus the link cost for a simulation of a 100 node network with an average connectivity of 4 and employing VS based multi-choice routing.

As a particular link gets more traffic, it leads to higher utilization of its link and buffer capacity, which increases the link cost, $C_{2ij}$. Hence, the subsequent data streams would tend to bypass the link by choosing alternate paths, if possible. This automatically tends to balance the network loading and can bring down the capacity utilization of the busy links over time. The simulation results presented in FIG. 2 show how the path selection of a given link is affected by the link cost function. As seen from the plot the link usage tends to fall with its cost as the VS based routing tends to find bypass paths. Thus, the VS based routing can lead to a fairly even load balancing in a network even under dynamic, bursty, and unpredictable traffic conditions for both, single-path as well as multi-path routing. Hence, it can result in better network utilization, higher throughputs, and lower network congestion.

In order to process the incoming packets at a fast speed each node may store the multi-dimensional VS coordinates of each neighboring node as well as the most recent link cost associated with it. Some of the calculations associated with total cost functions for each link can be pre-computed. Since the cost calculations for each link are independent, they can be done in parallel and can be accomplished in software or hardware.

In order to have efficient path termination at the destination, two additional schemes are also incorporated. The first, the so-called "one-hop termination" is used to force a packet to choose a direct link if the destination is one hop away from a given node, except when the link is broken. The second, the so-called "two-hop termination" can be implemented in two different ways. In first way, the two-hop termination is mere extension of the one-hop termination. Additional VS coordinate information along with the costs for nodes that are two hops away is stored at each node and used for routing. In another way, the two-hop termination is implemented by modifying the first term of the total cost function (term based on destination angle) only when the distance to destination, $d_{iD}$, is less than 2 units, indicating a possible distortion. The term is modified to $$C_1 \cdot [1-\cos(\theta_j - \theta_o)], \text{ where, } \theta_o = \cos^{-1}(d_{iD}/2) \ldots \text{ for } d_{iD} < 2$$

This ensures that the packet does not wander around if there is any irregularity in the VS configuration near the destination. The simulation results presented here use the one-hop termination and two-hop termination of the second type.

In addition time-to-live (TTL) field is used in the VS header of each packet to avoid any packets getting caught in the loops. This field is decremented by one at every hop and the packet is deleted when it reaches zero. The simulation results presented here use the initial TTL value of 40, but other values may also be used. Those packets that do not reach the destination in 40 hops are considered to be caught in the loop. In order to reduce the chances of looping the nodes prone to participate in looping (either due to bad connectivity or local discrepancy in the VS configuration) are identified as red-nodes by the central node. For each red-node a well-behaving (with low probability of looping) neighbor is identified as a green-node. Each packet has a red-node count (2-bit flag) and every time a packet reaches a red-node the count is raised by one. Once the count reaches a fixed value (such as 4 for example) the packet is deflected to the green-node. For the simulation results presented here, up to 2–3% nodes are identified as red-nodes, depending upon the need.

Several randomly constructed networks were simulated to check the performance of the VS based routing. The table below shows average throughput results for 100 node networks with an average connectivity of 4 and 6 using the five-dimensional VS based routing using multi-path and single-path schemes. The link costs (loading) are randomly distributed between 0.2 and 0.8, as mentioned in the earlier discussion. The VS based routing has also been simulated under the conditions of 5% and 10% link breakages (selected randomly) as conditions of extreme adversity in the network. The results show high throughputs under all conditions. However, networks with high connectivity and the multi-path scheme tend to benefit in finding alternate paths and increasing throughput.

| Link Breaks | Connectivity = 6 Multi-path | Connectivity = 6 Single path | Connectivity = 4 Multi-path | Connectivity = 4 Single path |
|---|---|---|---|---|
| 0% | 99.94% | 99.92% | 99.93% | 99.86% |
| 5% | 99.81% | 99.86% | 99.67% | 99.15% |
| 10% | 99.76% | 99.73% | 99.24% | 98.57% |

Figure 3:
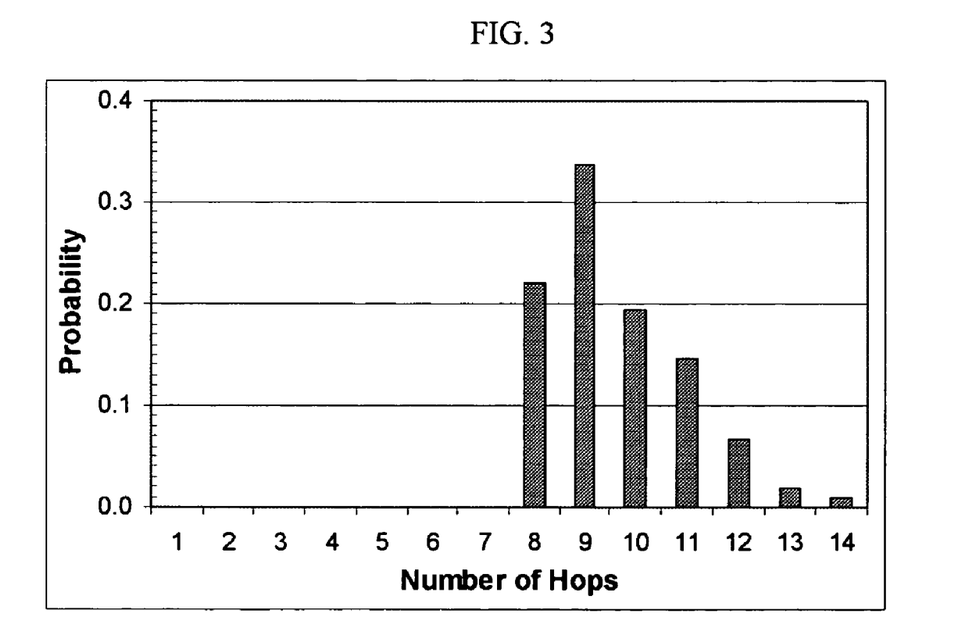
FIG. 3 is a plot of probability of completing a path in a given number of hops (as X-axis) for all source-destination node pairs having the least number of hops path of 8 hops, based on simulation of a 100 node randomly built network with an average connectivity of 4 and employing VS based multi-path routing.
Figure 4:
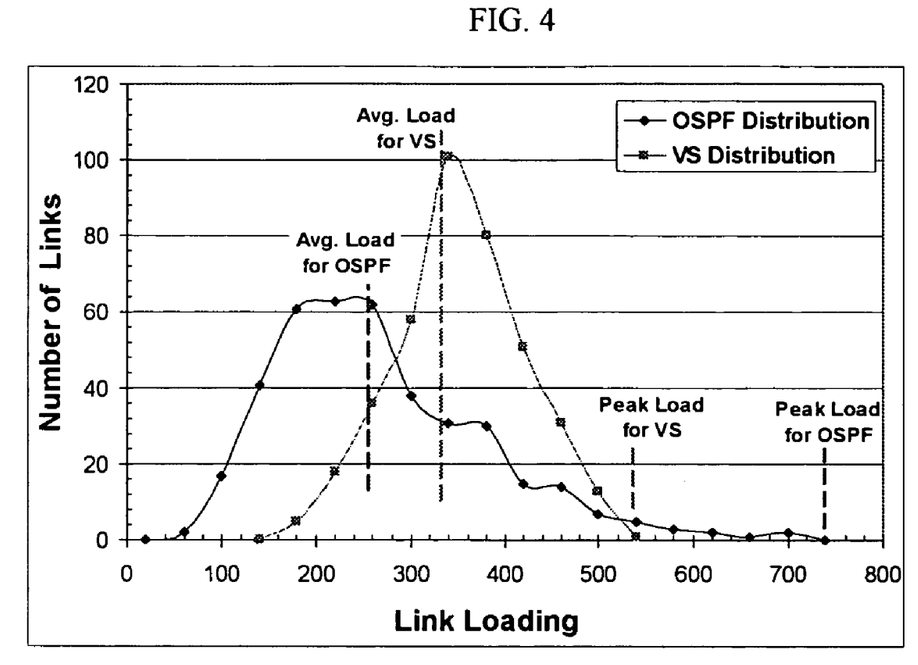
FIG. 4 is a comparison of the link distributions versus link loading for the OSPF and VS routing, for a randomly constructed 200-node network under an arbitrary demand matrix.

FIG. 3 shows a plot of probability of completing a path in a given number of hops for all source-destination node pairs having the least number of hops of 8 for a 100 node network with average connectivity of 4 and employing VS based multi-path routing. The results show that 90% of the paths have between 8 to 11 hops, i.e. the selection closely matches with the least (or low) number of hops. In addition the VS based routing takes into account the dynamic link costs helping alleviate traffic congestion with minimal exchange or storage of routing information. The comparison of the link distributions for the OSPF and VS routing as a function of the link loading is shown in FIG. 4. The plot shows that the VS distribution function has excellent load balancing properties. Since the information about a link breakage, a node failure, or dynamic load conditions does not flow to all distant nodes, the network quickly adapts to any dynamic conditions. This can avoid problems in traditional IP routing such as, load oscillations or delay in converging to new routing paths.

Some embodiments can be implemented in software and executed on the network processor or general purpose processor or on the forwarding engines at individual input ports. It can also be implemented in hardware using an FPGA circuit or a dedicated low complexity ASIC. The implementations in both, software as well as hardware can be simple, fast, and cheap. The algorithms implemented tend to have natural parallelism that can be exploited for further speed-up.

In another embodiment, the constants and functional forms used in the force equations can be changed to optimize the evolution of the network topology in the virtual space. In a similar manner, the cost function used for path selection can also be optimized to best suit the networks under consideration and the policy issues. The path termination schemes, mentioned above, can be further optimized or extended without deviating from the basic invention presented here.

In another embodiment, the VS based routing can be used for building an overlay tool rather than a stand-alone routing protocol. In this embodiment, the VS based routing scheme can be used for establishing a virtual circuit switching or label swapping paths in terms of ATM virtual path and circuit identifiers (VPI/VCI) or MPLS labels. It can be used with the conventional IP, ATM, or MPLS for path selection, QoS support, protection, and traffic engineering.

In another embodiment, the VS based routing can be used to provide path selection, QoS support, protection switching, traffic engineering, and priority-based differential services by modifying the cost function as per the requirements. Different link cost functions can be used for each priority level or a class of service, to achieve differential services. A certain portion of the link and buffer capacity can be reserved for high priority traffic or specific QoS requirements. This can be used to ensure the highest quality of service to the highest priority traffic.

In another embodiment, the VS based routing can be used to provide protection facility in generalized MPLS or GMPLS. Many existing networks use either SONET or SDH ring topologies, such as unidirectional path-switched rings (UPSR) or bi-directional line-switched rings (BLSR) or use dedicated back-up paths (or 1+1 protection) to provide the protection facility. Some times the protection facility is shared among multiple paths. The back-up paths or ring topologies (e.g. UPSR or BLSR) can re-establish all the existing communication channels in less than 50 milliseconds including detection of a link breakage or node failure and restoration of the communication channels. This quick restoration is important for real-time applications such as voice, video, and mission critical tasks. However, a lot of network bandwidth is left unutilized or under-utilized in order to provide this protection facility. Although a mesh-based optimal protection can lead to a significant improvement in the network capacity utilization, the restoration time has traditionally been poor. The traditional mesh-based protection requires sending the failure information back to the source or destination to initiate rerouting process. The rerouting involves the participating nodes to converge to a new solution to reestablish connections and hence, the process is a lot slower than say BLSR protection. Whereas, the VS based routing uses mesh based network topology and still restores the back-up paths quickly. Just like the BLSR protection, in the VS based routing only the nodes connected to the failed link complete the rerouting of the network traffic through the available links providing the necessary protection. Thus, the present invention can enable both quick restoration and better network capacity utilization and hence, can lower the costs associated with the infrastructure build-out.

In another embodiment, the VS based routing can be used to control multi-commodity flow systems, such as distribution of various commodities from manufacturing sites to the warehouses. In this application trucks carrying different goods act like packets in the communication network and roadways act as different links between the nodes. With the just-in-time deliveries to minimize the inventory the distribution plays an important role. The VS based routing can be used to quickly adapt to the dynamic flow conditions.

In one embodiment, the invention is a medium embodying instructions. The instructions, when executed by a processor, cause the processor to execute a method of operating a network. The method includes translating a topology of the network into a digital representation in the form of multi-dimensional spatial (virtual space) configuration. The method further includes adding transmission cost data to the digital representation. The method also includes operating the network based on the digital representation.

In an alternate embodiment, the invention is an apparatus. The apparatus includes a network topology translator for a digital representation in the form of multi-dimensional spatial (virtual space) configuration. Moreover, the apparatus includes a link and node cost update module and a network digital representation storage module coupled to the network topology translator and the link and node cost update module. Furthermore, the apparatus includes a network controller coupled to the network digital representation storage module.

In another alternate embodiment, the invention is an apparatus for operating a network. The apparatus includes means for translating a topology of the network into a digital representation in the form of multi-dimensional spatial (virtual space) configuration. The apparatus also includes means for adding transmission cost data to the digital representation. The apparatus further includes means for operating the network based on the digital representation.

In still another alternate embodiment, the invention is a method of operating a network. The method includes translating a topology of the network into a digital representation in the form of multi-dimensional spatial (virtual space) configuration. The method also includes simulating the network using the digital representation to add transmission cost data to the digital representation. The method further includes operating the network based on the digital representation.

In yet another alternate embodiment, the invention is a method of operating a network. The method includes translating a topology of the network into a digital representation. The method also includes simulating the network using the digital representation to adjust the digital representation. The method further includes operating the network based on the digital representation.

In still another alternate embodiment, the invention is a medium embodying instructions. The instructions, when executed by a processor, causing the processor to execute a method of operating a network. The method includes translating a topology of the network into a digital representation. The method further includes simulating the network using the digital representation to adjust the digital representation. The method also operating the network based on the digital representation.

In yet another alternate embodiment, the invention is a method of operating a network. The method includes representing in a digital representation of spatial configuration a network topology of individual nodes and connections of the network. The method further includes simulating forces on the individual nodes in a multi-dimensional space to transform the digital representation. In the digital representation, a directed distance to any destination node or site indicates the available path options with a low (or least) number of hops through the network. The method also includes operating the network using the digital representation.

Referring specifically to the figures, FIG. 1(a) is a 25 node network with average connectivity of 4 and randomly selected network connections built as a planar topology with random coordinates. Nodes 1–25 may represent processors or servers of a network with links therebetween for example. FIG. 1(b) is the same 25 node network as in part (a) but shown after evolution in the three-dimensional virtual space, i.e., a 3-D VS configuration. FIG. 2 is a plot of the normalized link usage versus the link cost. The simulations are carried out for a 100 node network with an average connectivity of 4 and employing VS based multi-choice routing. FIG. 3 is a plot of probability of completing a path in a given number of hops (as X-axis) for all source-destination node pairs having the least number of hops path of 8 hops. The simulations are carried out for a 100 node randomly built network with an average connectivity of 4 and employing VS based multi-path routing. FIG. 4 is a comparison of the link distributions versus link loading for the OSPF and VS routing, for a randomly constructed 200-node network under an arbitrary demand matrix. The plot shows that the VS distribution function has excellent load balancing properties.

Figure 5:
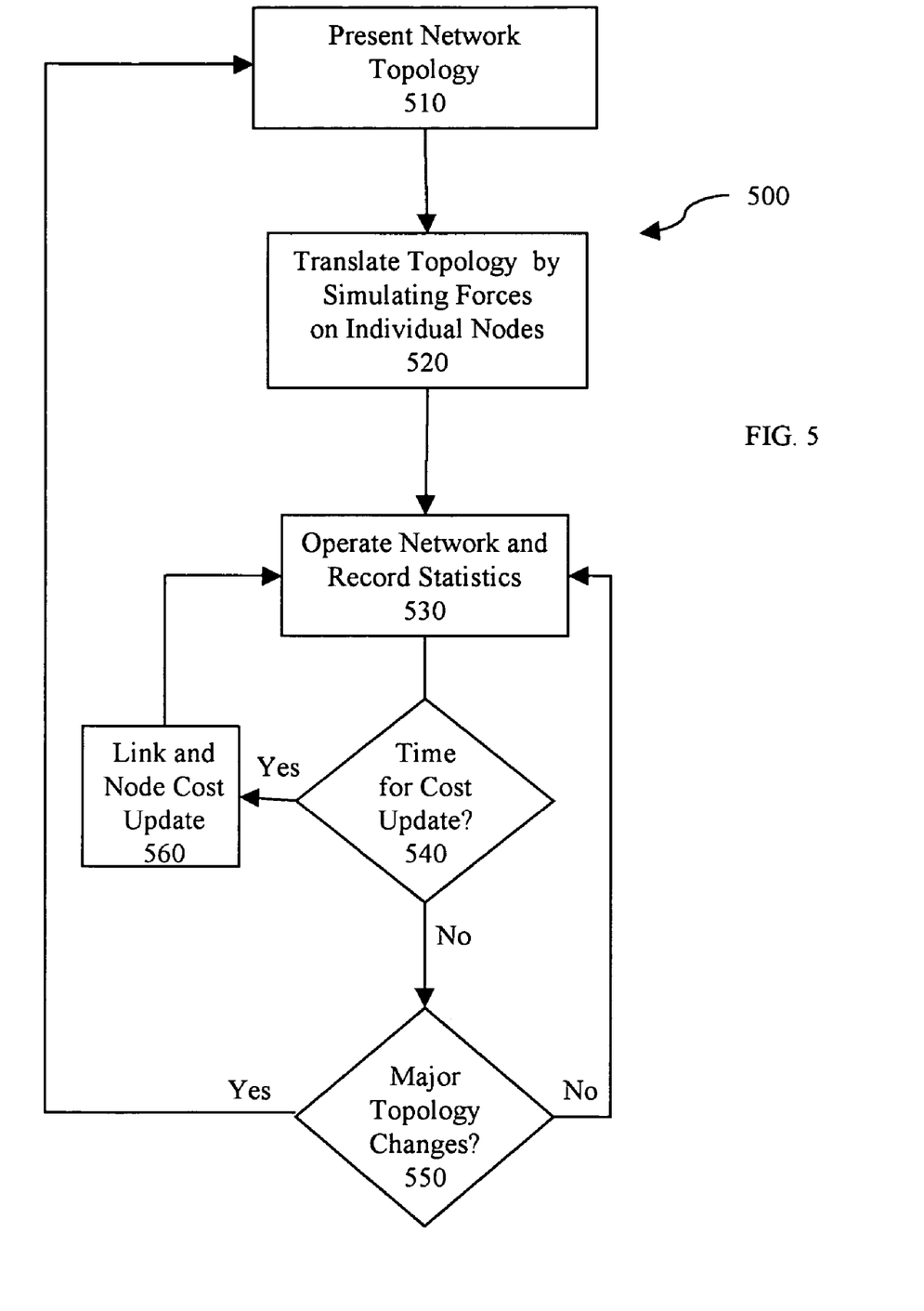
FIG. 5 illustrates an embodiment of a method of modeling and using a network.

FIG. 5 illustrates an embodiment of a method of modeling and using a network. The method may be implemented in various different ways, depending on external influences and implementation details. However, the method may be expected to include translating a network topology into a digital representation in the form of multi-dimensional spatial configuration whereby a directed distance to any destination node or site indicates the available path options with the least or a low number of hops through the network. It may further include addition of any available usage data to the digital representation, using the digital representation to route flow through the network, and recording results of network operations for usage data updates.

As illustrated, method 500 includes a set of modules. At module 510, the topology of the network is provided as input. The topology information is translated into the virtual space digital representation using a force simulator at module 520. At module 530, the network is operated (such as by routing data through it for example), and usage data is recorded. Operation may involve looking up a routing path for a data packet in a virtual space representation, then routing the data packet along the routing path for example. Usage data may include how many packets are routed through a given link and/or node, capacity of a link, effectiveness of links within the network (fast or slow transmission for example), overall packet throughput, and other data.

At module 540, a determination is made as to whether a periodic update of the link and node costs should occur. If such an update should occur, the process moves to module 560 for a cost update based on recently available usage data. If no update is due to occur, then at module 550, a determination is made as to whether major topology changes have occurred within the network. If major changes have occurred, the process moves to module 510 for updating the present network topology, followed by translation of the network topology to the virtual space representation. If no major topology changes have occurred (or a predetermined threshold of changes has not been met), operation of the network continues at module 530.

Figure 6:
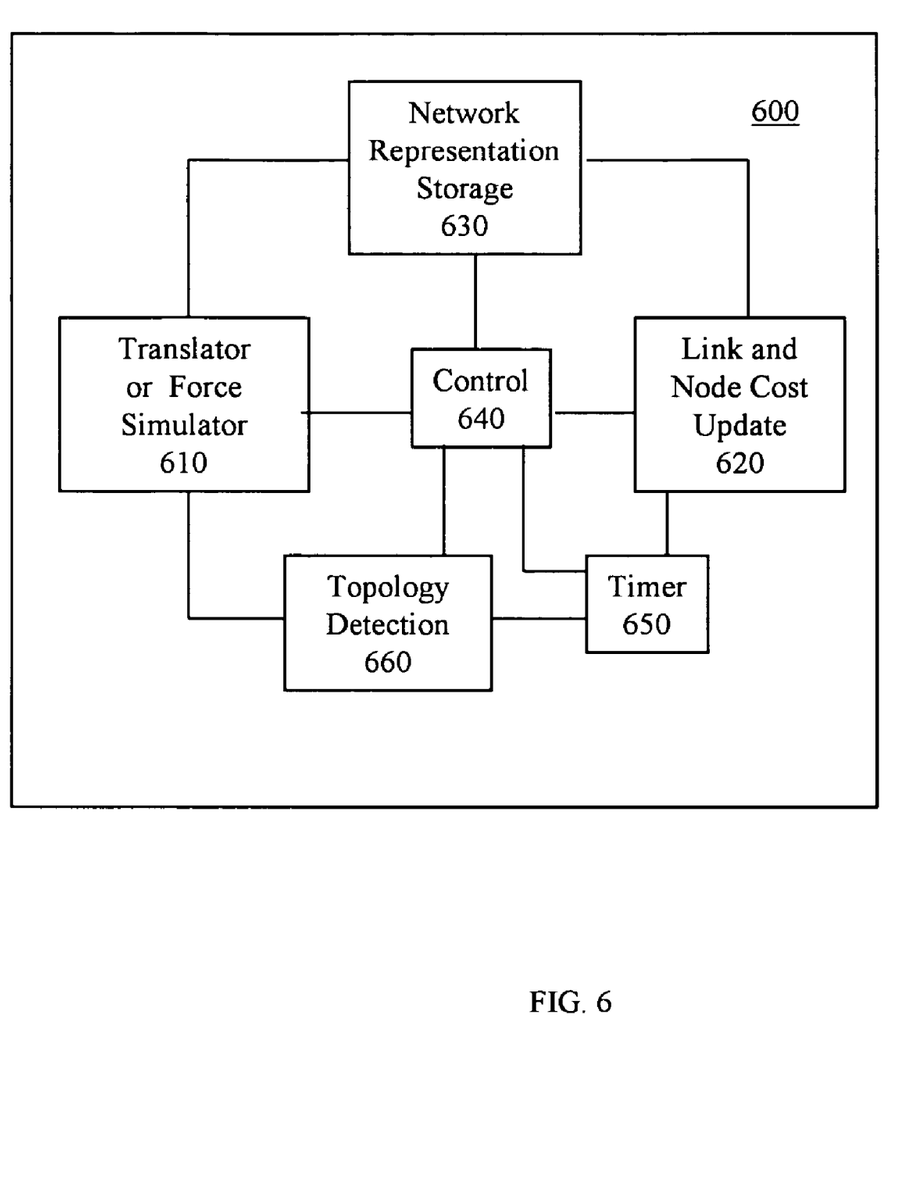
FIG. 6 illustrates an embodiment of a medium or media which may be used to model and use a network.

Embodiments may also be implemented as apparatuses or media, which may be operated or executed to improve network operations. FIG. 6 illustrates an embodiment of a medium or media which may be used to model and use a network. Such a medium or multiple media may embody instructions which may be executed by a processor to cause the processor to perform a method. Alternatively, the medium or media may be blocks or modules (apparatus or method components for example) which may operate to perform the described functions. Medium 600 includes multiple modules which may be used to perform a method or operate as an apparatus which models a network using virtual space representation and provides routing information for flow through that network.

Translator module 610 translates a network topology into a digital representation of the network in the form of multi-dimensional spatial configuration using force simulations. Link and node cost update module 620 determines costs (or updated costs) based on any available network usage data. Network representation storage module 630 stores the digital representation of the network, along with link and node costs of transmission through various paths.

Control module 640 controls the other parts of medium 600 and operates the network. Control module 640 may look up transmission paths for data packets or other things to be transmitted using the data available from module 630, and may propagate the data to other network nodes of the network, allowing for local determination of transmission paths. Control module 640 may also operate the network based on the transmission paths it looks up. Timer module 650 determines when periodic updates of the link and node cost data need to or should occur (such as after a predetermined amount of time elapses for example), and alerts the module 620 accordingly. Topology detection module 660 detects network topology and may explore the network or rely on network connections reported by nodes of the network for example. Module 660 also determines when a major topology change, or a predetermined number of changes, occurs, thus triggering another translation of the topology of the network through module 610.

In another embodiment, the functionalities of the modules 620, 630, and 640 for the cost update, network control, and network representation storage are implemented in a distributed manner at each node in the network. Thus routing of data packets is decided by the local node along the path through the network and the routing implementation is decentralized.

From the foregoing, it will be appreciated that specific embodiments of the invention have been described herein for purposes of illustration, but that various modifications may be made without deviating from the spirit and scope of the invention. In some instances, reference has been made to characteristics likely to be present in various or some embodiments, but these characteristics are also not necessarily limiting on the spirit and scope of the invention. In the illustrations and description, structures have been provided which may be formed or assembled in other ways within the spirit and scope of the invention.

In particular, the separate modules of the various block diagrams represent functional modules of methods or apparatuses and are not necessarily indicative of physical or logical separations or of an order of operation inherent in the spirit and scope of the present invention. Similarly, methods have been illustrated and described as linear processes, but such methods may have operations reordered or implemented in parallel within the spirit and scope of the invention. Accordingly, the invention is not limited except as by the appended claims.

I claim:

1. A method of operating a network, comprising:
    representing a network topology of individual nodes and connections of the network in a digital representation of spatial configuration;
    simulating an attractive force between directly connected nodes, a repulsive force between not directly connected nodes, and a deterministic pseudo-random forces on the individual nodes in a multi-dimensional space to transform the digital representation into a new representation of the same nodes and connections by letting the network evolve under the influence of the simulated forces, wherein a directed spatial distance within the digital representation to any destination node or site indicates the available path options with a low number of hops through the network; and
    operating the network using the digital representation.

2. The method of claim 1, further comprising:
    propagating the digital representation to nodes of the network.

3. The method of claim 1, further comprising:
    propagating the digital representation throughout the network.

4. The method of claim 1, further comprising:
    detecting changes to the network; and
    repeating the representing and the simulating.

5. The method of claim 1, further comprising:
    detecting a periodic update time; and
    updating the digital representation.

6. The method of claim 1, further comprising:
recording usage data of individual network links;
assigning costs to the network links and nodes;
assigning a total cost to a link that reflects both cost based on low-hop path to destination and link and node costs based on usage data; and
using the total cost value for path selection at an intermediate node towards the destination.

7. The method of claim 6, further comprising:
detecting changes to the usage data of individual network links; and
updating the link and node costs.

8. The method of claim 6, further comprising:
detecting failure in individual network links or nodes; and
updating the link and node costs to reflect failure.

9. The method of claim 6, further comprising:
detecting a periodic update time; and
updating the link and node costs based on usage data.

10. The method of claim 1, further comprising:
exploring the network to determine the topology of the network.

11. The method of claim 1, wherein:
the network is an electronic network for transmission of data packets, including processor nodes.

12. The method of claim 1, wherein:
the network is a transportation network for goods, including community nodes and transportation links.

13. The method of claim 1, wherein:
the digital representation includes a graph of the network.

14. The method of claim 1, wherein:
within the digital representation a node represents a cluster of nodes in the network.

15. The method of claim 6, wherein:
the network is an electronic network for transmission of data packets, including processor nodes.

16. The method of claim 6, wherein:
the network is an electronic network for transmission of data packets, including processor nodes and the method is used for path selection.

17. The method of claim 6, wherein:
the network is an electronic network for transmission of data packets, including processor nodes and the method is used for primary and back-up path selection.

18. The method of claim 6, wherein:
the network is a transportation network for goods, including community nodes and transportation links.

19. The method of claim 1, wherein: the attractive and repulsive force magnitudes depend on the spatial distances between the nodes in a spatial representation of the network.

20. The method of claim 1, further comprising:
converting external network addresses into addresses related to the digital representation.

21. An apparatus, comprising:
a network topology translator to produce a digital representation of network topology in the form of multi-dimensional spatial configuration;
a simulator module to simulate an attractive force between directly connected nodes, a repulsive force between not directly connected nodes, and a deterministic pseudo-random force on the individual nodes in a multi-dimensional space to transform the digital representation into a new representation of the same nodes and connections by letting the network under the influence of the simulated forces, wherein a directed spatial distance within the digital representation to any destination node or site indicates the available path options with a low number of hops through the network;
a link and node cost update module;
a network digital representation storage module coupled to the network topology translator and the link and node cost update module; and
a network controller.

22. The apparatus of claim 21, wherein:
the network topology translator includes a force simulator.

23. The apparatus of claim 21, further comprising:
a network change detector coupled to the network controller.

24. The apparatus of claim 21, further comprising:
a network periodic update timer coupled to the network controller and the link and node cost update module.

25. The apparatus of claim 21, wherein:
The network digital representation storage module further stores usage data and link and node costs of the network.

26. The apparatus of claim 21, further comprising:
a network topology exploration module.

27. The apparatus of claim 21, wherein:
the digital representation storage module stores a graph of the network.

28. The apparatus of claim 21 further comprising:
an address converter coupled to the controller.

29. The apparatus of claim 21, wherein:
the cost update module, digital representation storage module, and the network controller are implemented in a distributed manner using nodes in the network.

30. A computer readable medium embodying instructions, the instructions, when executed by a processor, causing the processor to execute a method of operating a network, the method comprising:
translating a topology of the network into a digital representation in the form of multi-dimensional spatial configuration;
simulating an attractive force between directly connected nodes, a repulsive force between not directly connected nodes, and a deterministic pseudo-random force on the individual nodes in a multi-dimensional space to transform the digital representation into a new representation of the same nodes and connections by letting the network evolve under the influence of the simulated forces, wherein a directed spatial distance within the digital representation to any destination node or site indicates the available path options with a low number of hops through the network;
adding transmission usage cost data; and
operating the network based on the digital representation and usage data.

31. The medium of claim 30, wherein the method further comprises:
converting external network addresses into addresses related to the digital representation.

32. The medium of claim 30, wherein the method further comprises:
propagating the digital representation to nodes of the network.

33. The medium of claim 30, wherein the method further comprises:
propagating the digital representation throughout the network.

34. The medium of claim 30, wherein the method further comprises:
detecting changes to the network; and
repeating the translating the network in a changed state.

35. The medium of claim 30, wherein the method further comprises:
recording usage data of the network;
detecting a periodic update time; and
determining usage costs in the network in an updated state.

36. The medium of claim 30, wherein:
the digital representation includes a graph of the network.

37. The medium of claim 30, wherein:
translating a topology of the network into the digital representation includes simulating multi-dimensional forces acting on nodes of the network.

38. The medium of claim 37, wherein:
the forces include an attractive force between directly connected nodes, a repulsive force between not directly connected nodes, and a deterministic pseudo-random force on each node.

39. The medium of claim 30, wherein the method further comprises:
exploring the network to determine the topology of the network.

40. The medium of claim 30, wherein:
the network is an electronic network for transmission of data packets, including processor nodes.

41. The medium of claim 30, wherein:
the network is a transportation network for goods, including community nodes and transportation links.

42. An apparatus for operating a network, comprising:
means for translating a topology of the network into a digital representation in the form of multi-dimensional spatial configuration;
means for simulating an attractive force between directly connected nodes, a repulsive force between not directly connected nodes, and a deterministic pseudo-random force on the individual nodes in a multi-dimensional space to transform the digital representation into a new representation of the same nodes and connections by letting the network evolve under the influence of the simulated forces, wherein a directed spatial distance within the digital representation to any destination node or site indicates the available path options with a low number of hops through the network;
means for adding transmission cost data to the digital representation; and
means for operating the network based on the digital representation.

43. The apparatus of claim 42, further comprising:
means for detecting changes to the network.

44. The apparatus of claim 42, further comprising:
means for detecting a periodic update time;
means for recording usage data of the network; and
means for determining usage costs in the network in an updated state.

45. The apparatus of claim 42, further comprising:
means for exploring the network to determine the topology of the network.

46. A method of operating a network, comprising:
translating a topology of the network into a digital representation;
simulating an attractive force between directly connected nodes, a repulsive force between not directly connected nodes, and a deterministic pseudo-random force on the individual nodes in a multi-dimensional space to transform the digital representation into a new representation of the same nodes and connections by letting the network evolve under the influence of the simulated forces, wherein a directed spatial distance within the digital representation to any destination node or site indicates the available path options with a low number of hops through the network;
simulating the network using the digital representation to adjust the digital representation; and
operating the network based on the digital representation.

47. A computer readable medium embodying instructions, the instructions, when executed by a processor, causing the processor to execute a method of operating a network, the method comprising:
translating a topology of the network into a digital representation;
simulating an attractive force between directly connected nodes, a repulsive force between not directly connected nodes, and a deterministic pseudo-random force on the individual nodes in a multi-dimensional space to transform the digital representation into a new representation of the same nodes and connections by letting the network evolve under the influence of the simulated forces, wherein a directed spatial distance within the digital representation to any destination node or site indicates the available path options with a low number of hops through the network;
simulating the network using the digital representation to adjust the digital representation; and
operating the network based on the digital representation.

* * * * *